(12) United States Patent
Gattass et al.

(10) Patent No.: US 8,929,695 B1
(45) Date of Patent: Jan. 6, 2015

(54) N PORT FIBER OPTICAL SWITCH

(71) Applicants: Rafael Gattass, Washington, DC (US); Frederic H. Kung, Alexandria, VA (US); Leslie Brandon Shaw, Woodbridge, VA (US); Ishwar D. Aggarwal, Charlotte, NC (US); Jasbinder S. Sanghera, Ashburn, VA (US); Lynda E Busse, Alexandria, VA (US)

(72) Inventors: Rafael Gattass, Washington, DC (US); Frederic H. Kung, Alexandria, VA (US); Leslie Brandon Shaw, Woodbridge, VA (US); Ishwar D. Aggarwal, Charlotte, NC (US); Jasbinder S. Sanghera, Ashburn, VA (US); Lynda E Busse, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 316 days.

(21) Appl. No.: 13/672,473

(22) Filed: Nov. 8, 2012

Related U.S. Application Data

(60) Provisional application No. 61/568,706, filed on Dec. 9, 2011.

(51) Int. Cl.
*G02B 6/26* (2006.01)
*G02B 6/35* (2006.01)

(52) U.S. Cl.
CPC .................................... *G02B 6/35* (2013.01)
USPC ............................................................ 385/16

(58) Field of Classification Search
USPC ............................................................ 385/16
See application file for complete search history.

(56) References Cited

U.S. PATENT DOCUMENTS

| 4,652,081 A | 3/1987 | Fatatry |
| 2003/0091272 A1* | 5/2003 | Sigloch et al. ................. 385/22 |
| 2004/0057654 A1 | 3/2004 | Baasch et al. |

* cited by examiner

*Primary Examiner* — Uyen Chau N Le
*Assistant Examiner* — Hoang Tran
(74) *Attorney, Agent, or Firm* — US Naval Research Laboratory; L. George Legg

(57) ABSTRACT

An N port fiber optical switch includes a movable housing having a perimeter and N corners; a plurality N of optical fibers positioned within the housing and inside the perimeter; and a plurality N of actuators, wherein each actuator is positioned on a corresponding corner such that when selectively activated one or more of the actuators urges the movable housing and the plurality of optical fibers to a selected switch position. The switch provides short switching times and high power handling while allowing for a large number of ports and provides the capability of interfacing with and switching between a variable number of ports.

17 Claims, 10 Drawing Sheets

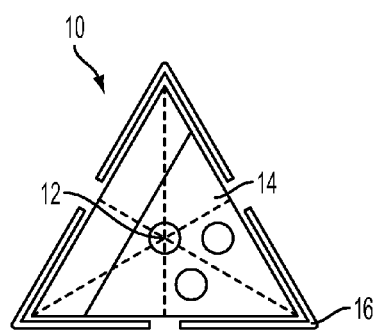
FIG. 2A
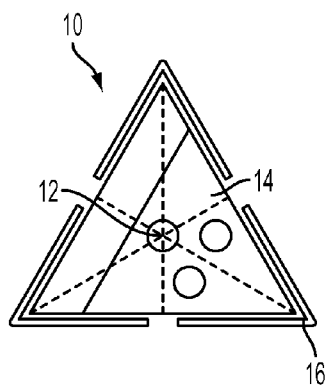 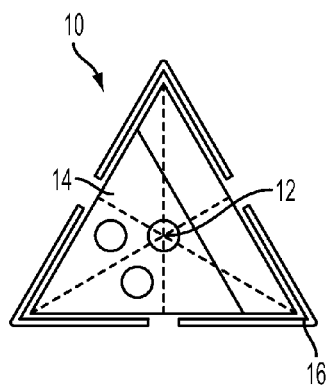 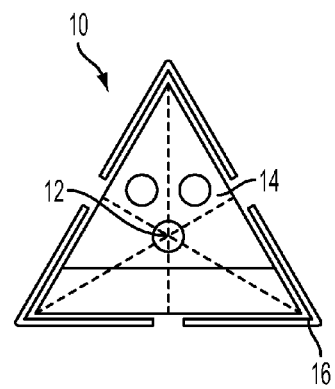
FIG. 2B   FIG. 2C   FIG. 2D

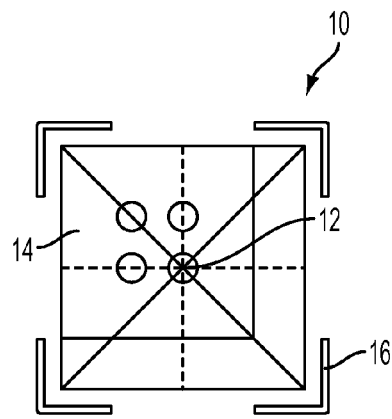
FIG. 3A
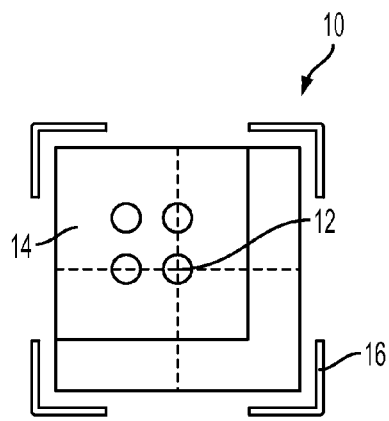 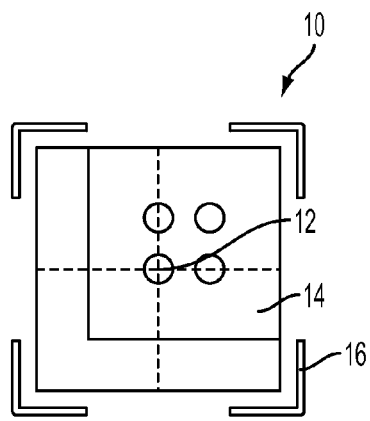
FIG. 3B  FIG. 3C
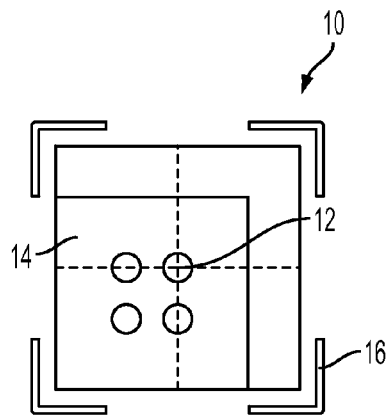 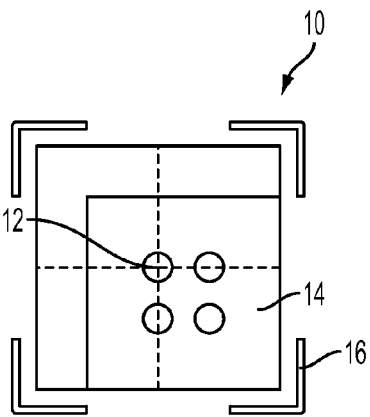
FIG. 3D  FIG. 3E

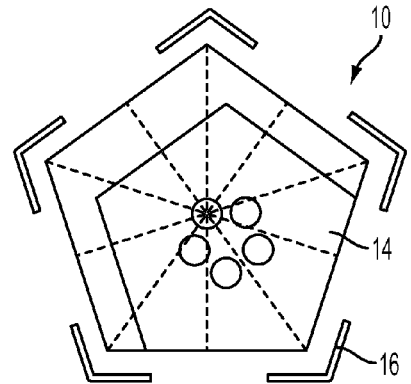
FIG. 4A
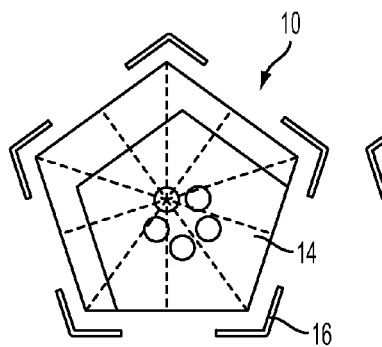 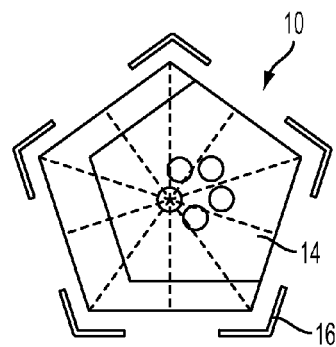 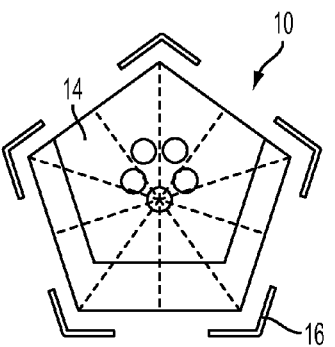
FIG. 4B    FIG. 4C    FIG. 4D
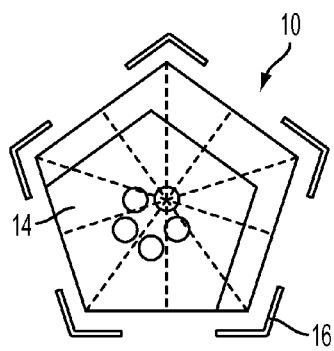 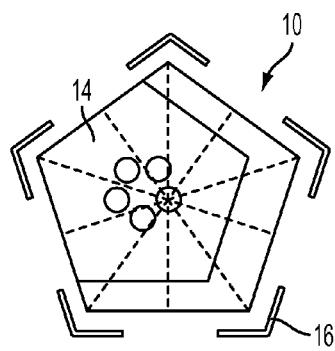
FIG. 4E    FIG. 4F

N PORT FIBER OPTICAL SWITCH

CROSS-REFERENCE TO RELATED APPLICATIONS

This Application claims the benefit of U.S. Provisional Application 61/568,706 filed on Dec. 9, 2011 and incorporated herein by reference.

FIELD OF THE INVENTION

The invention is directed to an optical switch, and in particular to an N port optical switch.

BACKGROUND OF THE INVENTION

Fiber optics switches are usually characterized with respect to their losses (insertion, transmission and reflection), switching time, repeatability, long term stability, temperature and vibration resistance, power handling, wavelength-range and number of ports. Various architectures and concepts have been proposed for optical routing with fiber optical switches among them systems based on movement (e.g. physical translation and bending) of fibers by directly moving the fiber, by moving the position of a reflective or refractive object, by altering the polarization in birefringent systems and through interferences caused by changes in the phase (spatial or temporal) of the optical signal.

Fiber optical systems involving physical effects such as polarization, birefringence, refraction and interference are sensitive to the optical wavelength and therefore manifest significant limitations in broadband optical signal switching applications. In particular for applications where the optical wavelength lies beyond the near infrared optical spectrum, including the mid-wave and long-wave infrared, many of the optical elements required for the polarization and interference switches have limited applicability or are not available. Fiber optical systems based on the movement of fiber for direct end-to-end fiber coupling or imaging-type systems including reflective mirror-type approaches are not as sensitive to the wavelength of light providing a viable alternative for broadband applications.

For switch alternatives based-on imaging-type and reflective mirror-type fiber optical systems, the optical signal has to exit the fiber and interact with at least another optical element reaching the routing fiber. Optical power handling in these systems is limited by the optical coating and the size of the optical elements used. Typically, the increase in the size of the optics correlates with increased switching times as more mass or larger distances need to be moved. Systems based on the movement of fibers such as end-to-end fiber coupling are power limited only by the maximum power handling of the optical fiber transmitting the signal.

US Patent Application No. 20040057654 to Baasch, describes a method for optical switching based on magnetic-actuation of an optical fiber. The optical fiber has a small magnetic bead attached to the end of the fiber, upon action of a magnetic field the bead (and hence the fiber) is attracted towards the magnet. Two fibers are placed along a horizontal plane defined by the magnets, allowing the signal to be switched from one fiber to another. U.S. Pat. No. 4,652,081 to Fatatry, describes a method for electro-magnetically translating a fiber among multiple fibers into a funnel shaped guide thereby aligning the selected fiber with the input fiber inside the guide. Neither of these approaches provides both simple fiber movements systems while providing the user with the flexibility of connecting the switch with other than a fixed number of ports.

It is therefore desirable to provide an optical fiber switch capable for use with simple fiber movements systems while also providing the design flexibility for use in different applications requiring disparate numbers of ports.

BRIEF SUMMARY OF THE INVENTION

According to the invention, an N port fiber optical switch includes a movable housing having a perimeter and N corners; a plurality N of optical fibers positioned within the housing and inside the perimeter; and a plurality N of actuators, wherein each actuator is positioned on a corresponding corner such that when selectively activated one or more of the actuators urges the movable housing and the plurality of optical fibers to a selected switch position.

The invention is a geometric arranged fiber array with the configuration possessing the same symmetry as the number of ports in the fiber optical switch. The invention includes a fiber actuation system, a stabilizing stop and an element that provides fine alignment individually for each port.

The present invention overcomes limitations in the prior art and reduces the switching time while maintaining mechanical simplicity by utilizing a system which maintains the same symmetry as the number of ports. The invention provides a translationally based fiber optical system with applications in broad-band optical signal routing, high-power signal routing and large number of ports signal rouging. The switch of the invention provides short switching times and high power handling while allowing for a large number of ports.

The switch configuration being based on the physical movement of fibers along a set of geometrically defined directions in 3D space allows the system to maintain many of the advantages of simple fiber movements systems while providing the capability of interfacing with and switching between a variable number of ports.

BRIEF DESCRIPTION OF THE DRAWINGS

FIG. 2 is an embodiment of an N port fiber optical switch showing different switched positions according to the invention;

FIG. 3 is an embodiment of an N port fiber optical switch showing different switched positions according to the invention;

FIG. 4 is an embodiment of an N port fiber optical switch showing different switched positions according to the invention;

DETAILED DESCRIPTION OF THE INVENTION

Figure 1A:
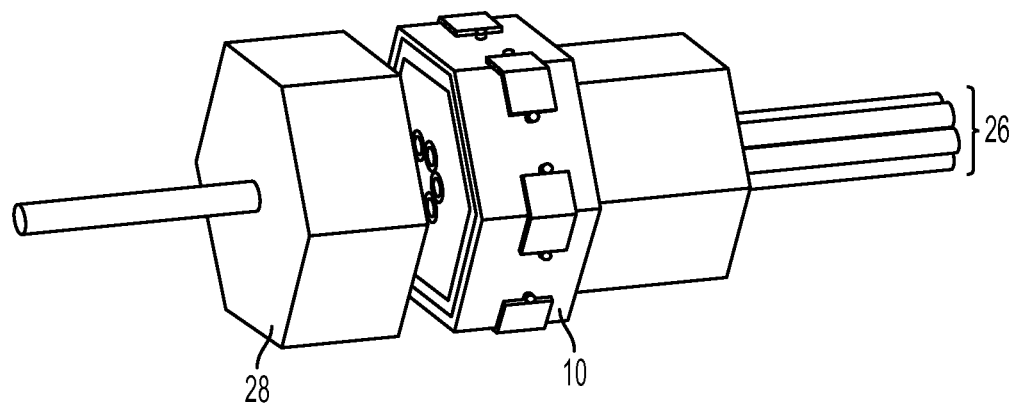
FIGS. 1A-B are a perspective view (FIG. 1A) and a cross-sectional view (FIG. 1B) of an N port fiber optical switch according to the invention.
Figure 1B:
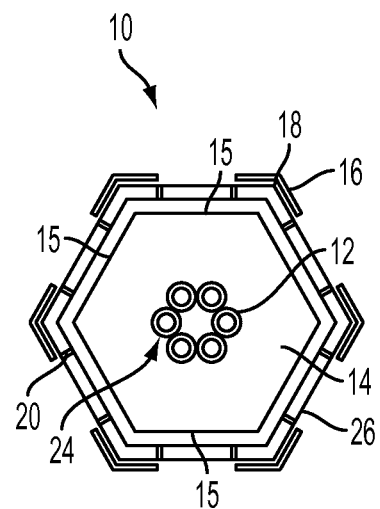
Figure 5A:
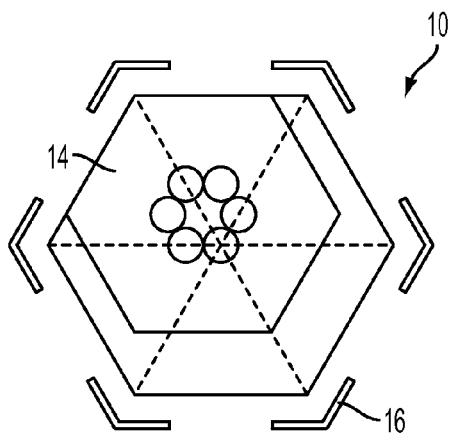
FIG. 5 is an embodiment of an N port fiber optical switch showing different switched positions according to the invention.
Figure 5B:
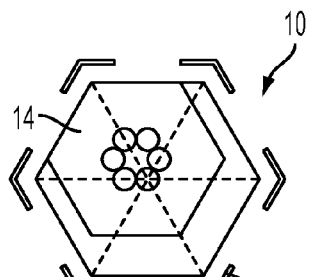
Figure 5C:
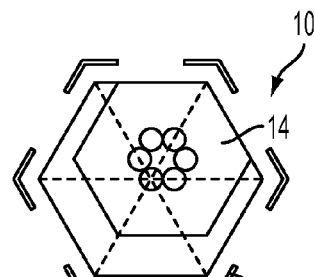
Figure 5D:
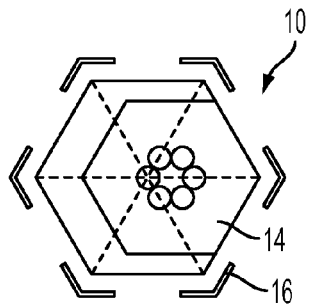
Figure 5E:
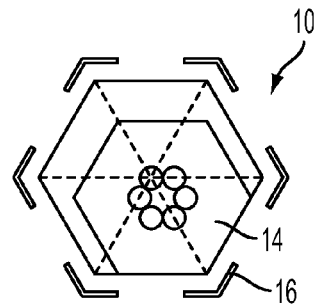
Figure 5F:
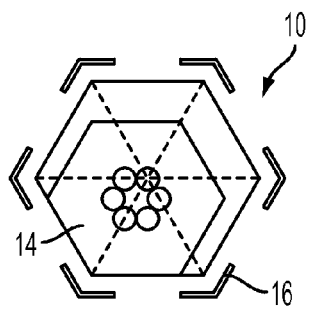
Figure 5G:
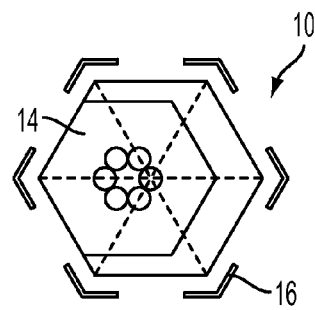

A diagram of one embodiment of the N port fiber optical switch 10 (with "N" indicating a variable, vs. fixed, number of ports, the number of ports being determined by the application/system requirements in which switch 10 is used, as is further discussed below) is shown in FIGS. 1A-B. Switch 10 consists of an optical fiber 12 mounted in a movable frame or housing 14 having a perimeter 15, a set of actuators 16 positioned along the corners 18 (or in another embodiment along the principal axis) of the movable housing 14 and as such being evenly spaced apart, a set of fine adjusters 20 for fine control of the final positions, and a group of optical fibers 24 mounted in a geometric position whose symmetry is the same as the number of ports 26 in the system. The optical fiber can be made of a variety of materials such as silica-based, fluoride-based, germanate-based and chalcogenide-based optical fibers. There are no restrictions on the type of fiber to be used including but not limited to multimode, single mode, graded index, double clad optical fibers. The number of ports N can be arbitrary large, in which case the geometrical shape approaches a circle, where as for smaller numbers such as 3, 4, 5, 6, 7, 8 it will be a triangle, a square, pentagon, hexagon, heptagon and octagon respectively. The optical switch is reversible with signal transmission possible in either direction, the switch acting as a 1×N optical switch if the signal is input from the single input fiber side or N×1 switch if various signals are inputted in the multiple fiber side.

FIGS. 2-5 show various geometries used for switches 10 with progressively increasing numbers of ports. The dotted lines delineate the symmetry direction and their intersection marks the position of the output fiber.

The lower parts of FIG. 2-4 show embodiments of the proposed system using a magnetic (such as a ferromagnetic or permanent magnet) movable block 14 and a set of electromagnets as actuators 16 to move the block 14 along the intended directions. The embodiments shown in FIGS. 2-4 include a ferromagnetic block 14 and a 3-port, 4-port and 5-port switch 10 respectively. The electromagnets shown in FIGS. 2-4 are small in size but could be larger if a magnetic arm is used. Should magnetic arms are commonly used in many electronic applications such as magnetic hard-drives and do not represent a challenge for those skilled in the art.

In the implementation shown in FIGS. 2-4, the moving fiber block 14 is attracted to the magnet 16 and locks into position at the corners 18. The use of a frame 26 is not required for the device but it is shown in the drawings. Optical routing occurs by selective activation of an electromagnet. Activating the magnetic field on the top left corner moves the fiber block 14, aligning the signal fiber 12 with Port 1. If the magnet is deactivated and the top right corner one is turned on the fiber block is attracted to the top right corner routing the signal to the top right fiber. Similarly, FIG. 5 shows a 1×6 switch where the mode of actuation could be a magnet.

The use of independently held and positioned magnets allows for individual fine tuning of the final position of the block with respect to the fixed fiber by adjustment of the magnets (or magnet arms). Additionally, a damping element (not illustrated) could be added to the magnet, a magnetic arm, the frame or the moving block to decrease the settling time of the fiber block. One such implementation would include the use of a material with acoustic damped response, reducing the ringing associated with an inelastic collision between the movable block and the electromagnetic actuator.

Actuators 16 in lieu of being magnetic may alternatively be solenoids-based, mechanical-based, piezoelectrically-based, based on microelectromechanical systems, or a combination there of in that some of the N actuators may be of one type and others may be of another type, depending on the specific application.

Figure 6A:
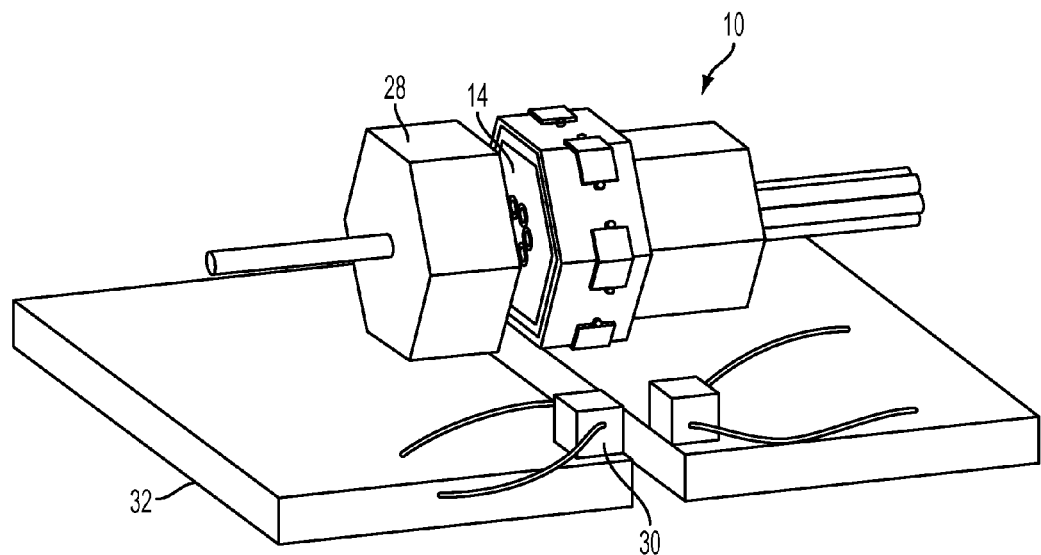
FIGS. 6A-B are a perspective view (FIG. 6A) and a top plan view (FIG. 6B) of an N port fiber optical switch according to the invention.
Figure 6B:
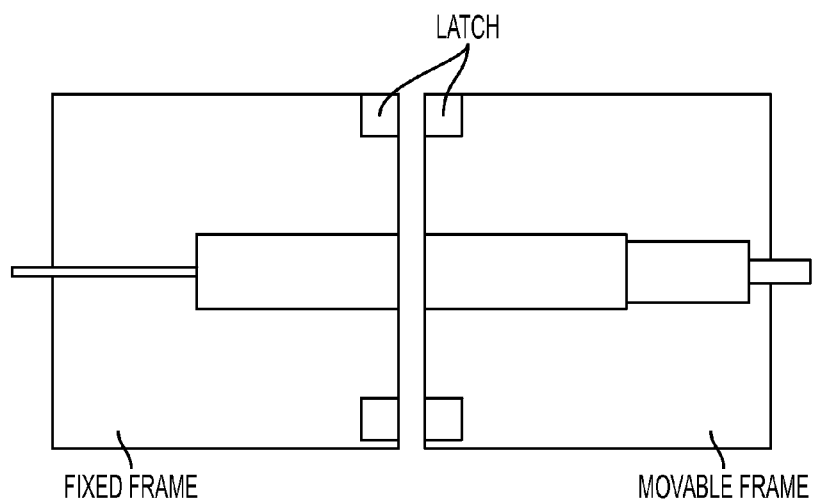

FIGS. 6A-B, show another embodiment of the system where an electromagnet 30 is placed on a carrier 32 on which the fixed block 28 is affixed to attract the movable block 14 to the fixed block 28 and ensure the spacing between the fiber is minimized and fixed.

In another possible embodiment the multiple fibers are place in the movable side of the switch and the single fiber is place in the fixed side.

Figure 7A:
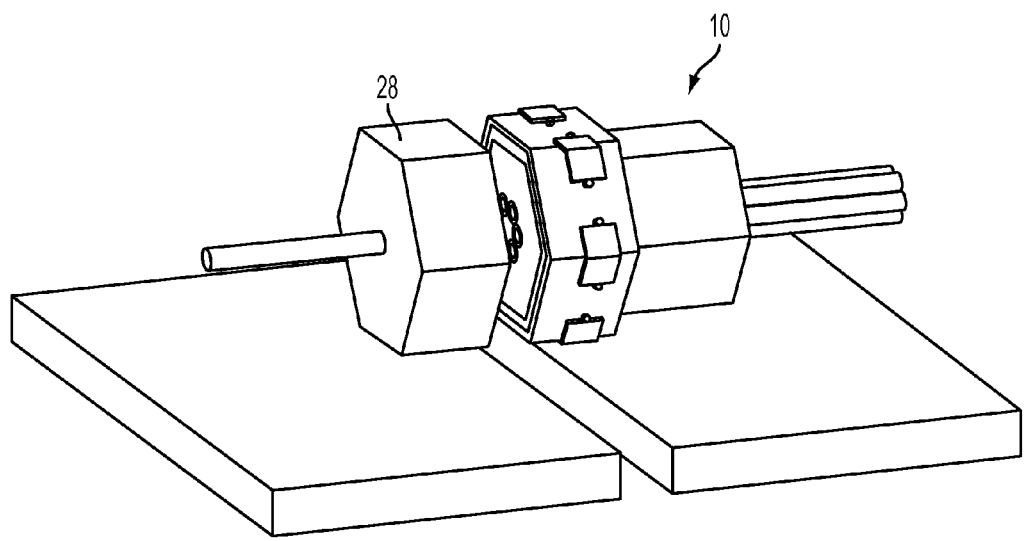
FIGS. 7A-B are a perspective view (FIG. 7A) and a top plan view (FIG. 7B) of an N port fiber optical switch according to the invention.
Figure 7B:
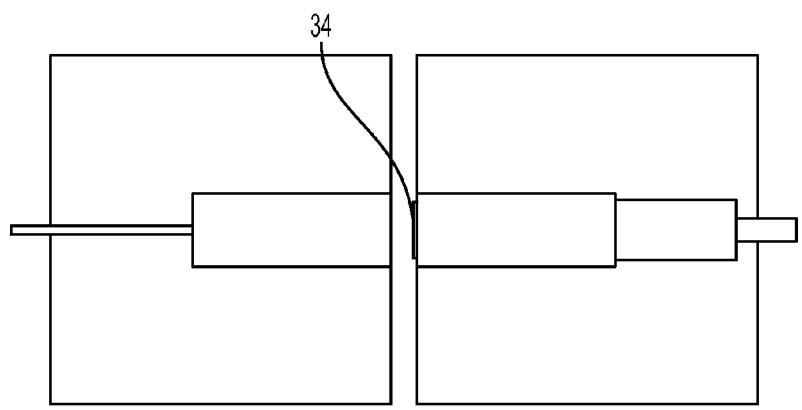
Figure 8A:
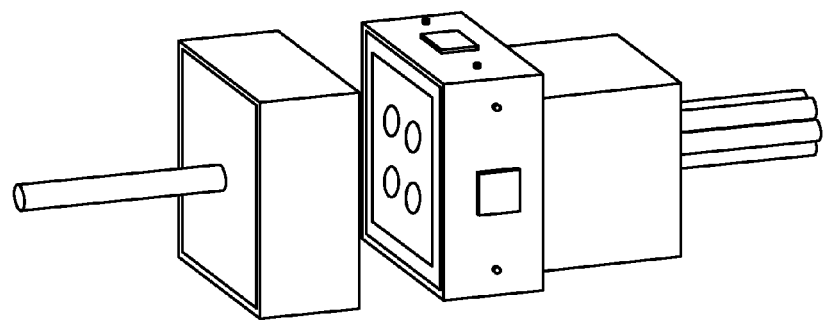
FIGS. 8A-D are different views as labeled illustrating an embodiment of an N port fiber optical switch according to the invention.
Figure 8B:
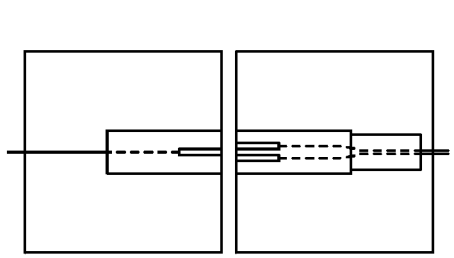
Figure 8C:
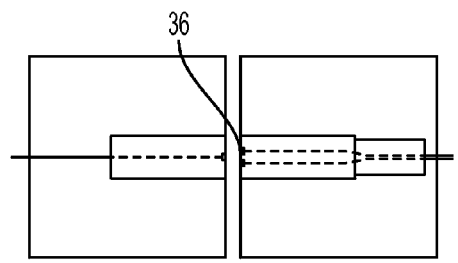
Figure 8D:
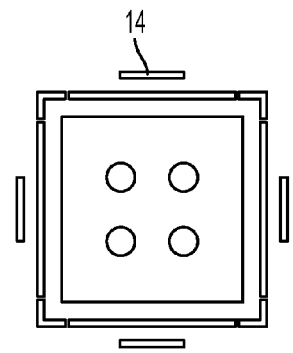

FIGS. 7A-B, depict the use of a mask 34 to protect the movable block (a similar embodiment could contain a mask at the fixed block). The mask is used to protect the block, the cladding and/or the protective layer of the optical fiber used from exposure to the incident light. Alternatively, the mask could be made of a thin film of a low friction material ensuring the distance between the movable and fixed arm remain stable through the movement.

FIGS. 8A-D show another embodiment of the system where the signal of each fiber is collimated by a lens 36 prior to exiting the fiber and/or entering the fibers. The fiber can be collimated with a variety of lens types including graded-index lenses and microlenses. Another possible embodiment is where the end face of the fiber is lensed to increase the signal transmission. FIGS. 8A-D also show how the actuators can be placed along the center of the lines between the corners, not just at the corners. Depending on the time of type of actuator chosen, more than on actuator might have to be enable to align and lock the movable block into a switching position.

Figure 9A:
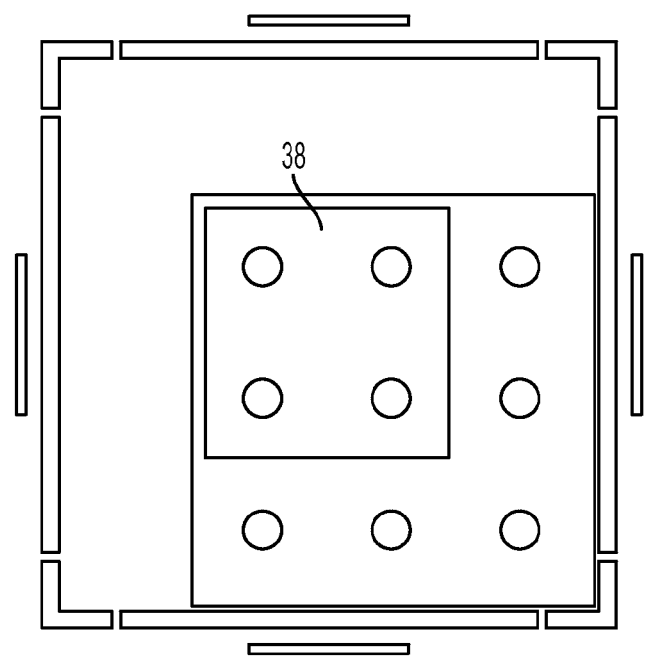
FIGS. 9A-B are cross-sectional views of an embodiment of an N port fiber optical switch according to the invention.
Figure 9B:
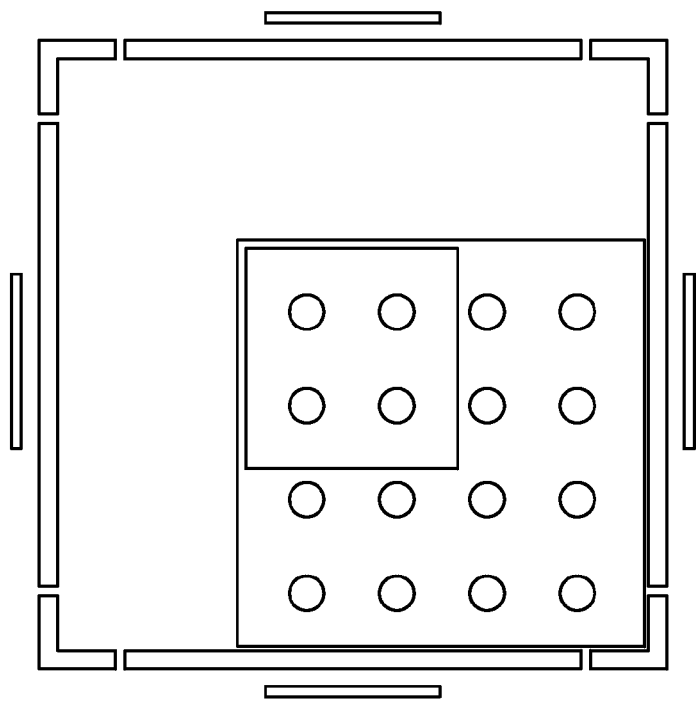

FIGS. 9A-B show another embodiment where the fixed fiber is a fiber bundle or a bundle of fibers 38. The optical switch would move a number of signal fibers simultaneously across the fixed fiber bundle 38. FIG. 9A shows a 4×9 (or 9×4) fiber switch with a redundant port (the center one). FIG. 9B shows an example of a 16×4 (or 4×16) fiber switch with no overlapping ports.

Figure 10A:
FIGS. 10A-B are different views as labeled illustrating an embodiment of an N port fiber optical switch according to the invention.
Figure 10B:
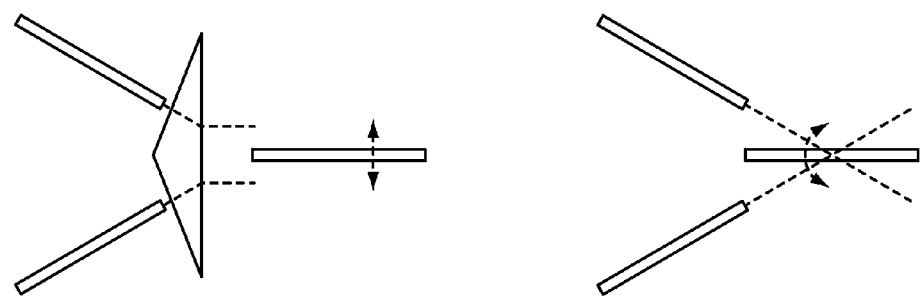

FIGS. 10A-B show two other concepts of the proposed switch. Both concepts involve angularly distributed fibers along the corners axis of a solid with the same symmetry as the number of ports. For this embodiment, a 5-port case is displayed. In the left hand side, an N-faceted pyramid with 5 facets and one base designed with the angular dispersion such that the light will be refracted as it is incident on the pyramid face and refracted in a parallel path to the single fiber optical axis. The pyramid acts to correct the optical paths for all the ports into parallel beams to the optical axis of the single fiber. Small translations of the single fiber couple the optical path from the single fiber to one of the ports attached to the pyramid. On the right hand side, the single fiber is encased in a hollow pyramid with 5 facets and no base and an open aperture at the vertex. An angular deflections a center fiber towards the interface between two facets of the pyramid, aligns the ports for signal transmission Angular deflection is activated outside the pyramid, with the interface between two facets acting as a limiting stop to the movement, ensuring stability.

While specific embodiments of the present invention have been shown and described, it should be understood that other modifications, substitutions and alternatives are apparent to one of ordinary skill in the art. Such modifications, substitu-

What is claimed as new and desired to be protected by Letters Patent of the United States is:

1. An N port fiber optical switch, comprising:
   a movable housing having a perimeter and N corners;
   a plurality N of optical fibers positioned within the housing and inside the perimeter; and
   a plurality N of actuators, wherein each actuator is positioned on a corresponding corner such that when selectively activated one or more of the actuators urges the movable housing and the plurality of optical fibers to a selected switch position.

2. The switch of claim 1, further comprising a plurality N of fine control adjusters with each respective fine control adjuster associated with a corresponding actuator for precision control of the selected switch position.

3. The switch of claim 1, wherein the movable housing is magnetic and the actuators are electromagnets.

4. The switch of claim 1, further comprising a fixed block having an optical fiber therein and wherein the fixed block is positioned relative to the switch such that each selected switch position aligns a selected optical fiber of the movable housing with the optical fiber of the fixed block and substantially in contact therewith so as to form a signal path for the conduction of an optical signal via the optical fiber in the fixed block through the selected optical fiber in the switch.

5. The switch of claim 4, further comprising a carrier block to which the fixed block is affixed and further comprising an electromagnet positioned on the carrier block for urging the fixed block into contact with the movable housing.

6. The switch of claim 4, further comprising a mask positioned on an exposed face of the movable block for protection from exposure to an incident light from the optical signal.

7. The switch of claim 1, wherein each of the N actuators is selected from the group consisting of magnetic-based, solenoids-based, mechanical-based, piezoelectrically-based, and microelectromechanical-based systems.

8. An N port fiber optical switch system, comprising:
   a movable housing having a perimeter and having N corners;
   a plurality N of optical fibers positioned within the housing and inside the perimeter of the housing;
   a plurality N of actuators, wherein each actuator is positioned on a corresponding corner such that when selectively activated one or more of the actuators urges the movable housing and the plurality of optical fibers to a selected switched position; and
   a fixed block having an optical fiber therein and wherein the fixed block is positioned relative to the switch such that each selected switch position aligns a selected optical fiber of the movable housing with the optical fiber of the fixed block and substantially in contact therewith so as to form a signal path for the conduction of an optical signal via the optical fiber in the fixed block through the selected optical fiber in the switch.

9. The switch system of claim 8, further comprising a plurality N of fine control adjusters with each respective fine control adjuster associated with a corresponding actuator for precision control of the selected switch position.

10. The switch system of claim 8, wherein the movable housing is magnetic and the actuators are electromagnets.

11. The switch of claim 8, further comprising a carrier block to which the fixed block is affixed and further comprising a fixed electromagnet positioned on the carrier block for urging the fixed block into contact with the movable housing.

12. The switch of claim 8, further comprising a mask positioned on an exposed face of the movable block for protection from exposure to an incident light from the optical signal.

13. The switch of claim 8, further comprising a lens for collimating the optical signal.

14. The switch of claim 8, wherein each of the N actuators is selected from the group consisting of magnetic-based, solenoids-based, mechanical-based, piezoelectrically-based, and microelectromechanical-based systems.

15. The switch of claim 8, where the fixed block comprises an array of M fibers where M<N that are positioned symmetrically within the fixed block such that when the actuators are activated each fiber in the fixed block is optically aligned with a corresponding fiber in the movable housing.

16. An N port fiber optical switch system, comprising:
    a fixed housing having a perimeter and having N corners and N ports;
    a movable three dimensional pyramid-shaped housing with N facets and a base transparent to a selected wavelength and configured to diffract a light signal from each port along a path parallel to a single element port;
    a plurality N of optical fibers positioned within the fixed housing and inside the perimeter; and
    a plurality N of actuators, wherein each actuator is positioned on a corresponding corner such that when selectively activated one or more of the actuators urges a single optical fiber to a selected switched position such that a fiber in the fixed housing block is optically aligned with the single optical fiber.

17. An N port fiber optical switch system, comprising:
    a fixed three dimensional pyramid-shaped housing having N facets, N corners, no base, an aperture at a vertex, and a perimeter;
    a plurality N of optical fibers positioned within the pyramid-shaped housing and inside the perimeter;
    a single optical fiber which is mounted through the top aperture of the three dimensional pyramid-shaped housing; and
    a plurality N of actuators, wherein each actuator is positioned outside the pyramid such that when selectively activated one or more of the actuators angularly deflects the single optical fiber along the facets or corners of the pyramid such that each selected position aligns a selected optical fiber in the pyramid-shaped housing with the single optical fiber and substantially in contact therewith so as to form a signal path for the conduction of an optical signal via the single optical fiber through the selected optical fiber.

* * * * *